United States Patent [19]

Bergeron

[11] 4,121,615
[45] Oct. 24, 1978

[54] VALVE CONTROL WITH INDICATOR

[75] Inventor: Ned A. Bergeron, Houma, La.

[73] Assignee: B. W. B. Controls, Inc., Houma, La.

[21] Appl. No.: 791,378

[22] Filed: Apr. 27, 1977

[51] Int. Cl.² ............................................. F16K 11/07
[52] U.S. Cl. .................................... 137/555; 137/552;
                                              137/557; 137/625.66
[58] Field of Search ............... 137/456, 458, 552, 553,
                                 137/555, 557, 624.27, 625.66

[56]         References Cited
        U.S. PATENT DOCUMENTS

| 3,877,484 | 4/1975 | Theriot et al. ................. 137/458 X |
| 3,878,862 | 4/1975 | Blanton ............................... 137/553 |
| 3,943,974 | 3/1976 | Connelly et al. ................. 137/624.27 |
| 4,026,326 | 5/1977 | Wells et al. ..................... 137/625.66 |

FOREIGN PATENT DOCUMENTS

| 1,290,398 | 3/1969 | Fed. Rep. of Germany ........... 137/553 |
| 1,964,127 | 6/1971 | Fed. Rep. of Germany ........... 137/557 |

Primary Examiner—Gerald A. Michalsky
Attorney, Agent, or Firm—Robert W. B. Dickerson

[57]            ABSTRACT

Device for controlling of the opening and closing of a valve, including an automatic lockout requiring a manual reset, and further having an indicator for indicating the position of said valve.

2 Claims, 1 Drawing Figure

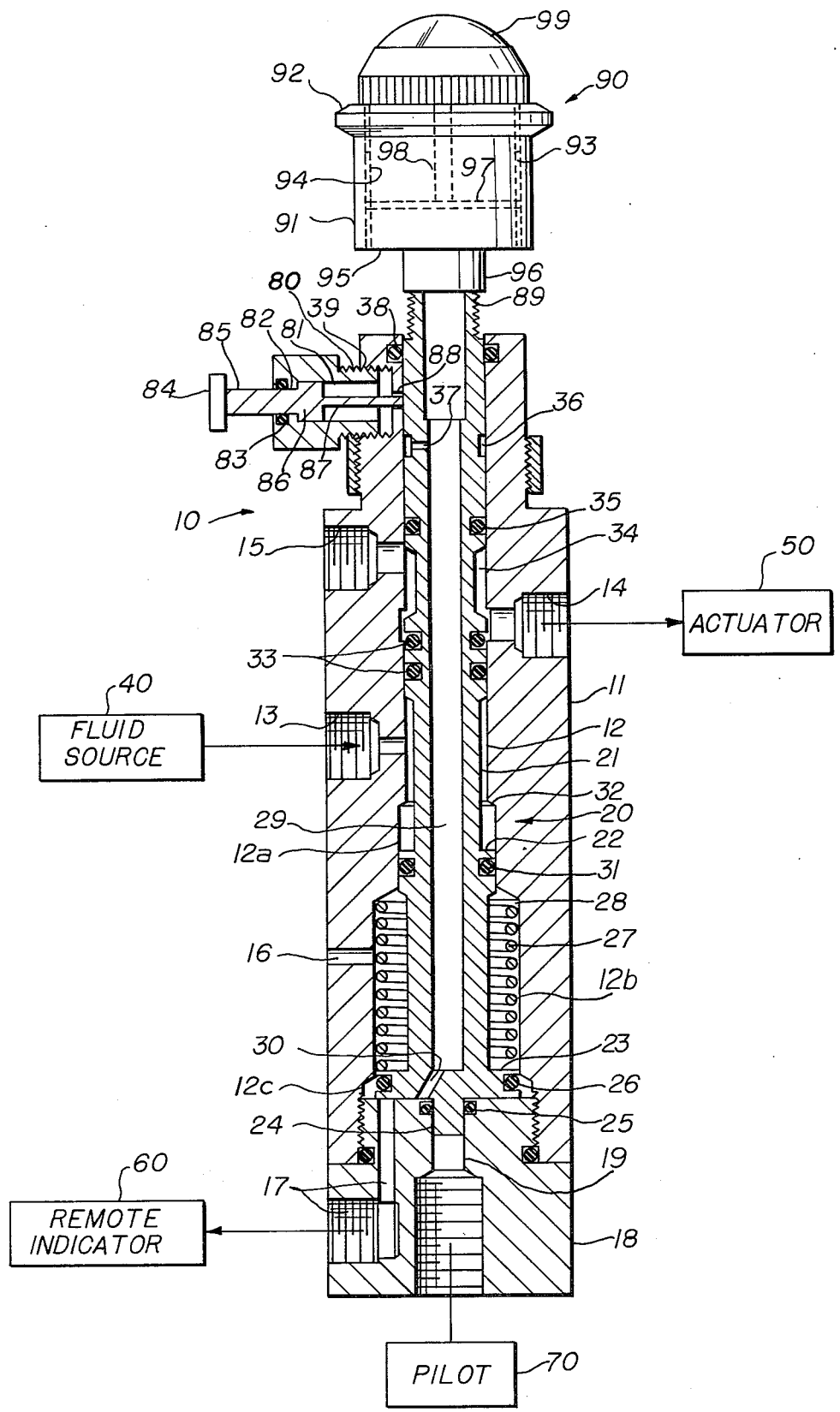

VALVE CONTROL WITH INDICATOR

BACKGROUND OF THE INVENTION

Control devices have long been used to regulate valve opening and closing, by controlling fluid flow to and from a valve actuator. As a safety feature, such controls must effect valve closure on the occurrence of certain events, such as the failure of pilot pressure. More recently, other safety considerations required such controls to have automatic lockouts, ie., on the valve being closed, pilot pressure, or the return thereof, could not alone cause valve reopening. Applicant's assignee contributed to this area of development through U.S. Pat. Nos. 3,963,050 and 3,877,484. In view of the apparent continuing need for more and better safety features, applicant's device satisfies the aforementioned needs, as well as uses the existance or absence of pilot pressure to provide visual or other indication of the valve position, or more specifically of the status of valve actuator fluid.

SUMMARY OF THE INVENTION

A centrally bored cylindrical body has a valve member slidable therein, said valve member including a stem and attached piston, The position of said piston and stem determines whether or not actuator fluid from an outside source may pass through the control to an exterior valve actuator. While the valve member may be biased toward a valve closed position, pilot pressure may retain the piston in a valve open position, once it is there. An automatic lockout feature requires exterior, usually manual, manipulation for the piston to move from a valve closed to a valve open position, ie., pilot pressure alone should not cause such movement. Finally, such pilot pressure serves to activate one or more indicator mechanisms, so that an observer, near or removed, may determine valve status.

DESCRIPTION OF THE DRAWINGS

The single FIGURE is a partly schematic, vertical section through the control comprising this invention.

DESCRIPTION OF A PREFERRED EMBODIMENT

Looking at the drawing, the numeral 10 indicates the control of this invention as a whole. Control 10 includes cylindrical housing 11 which is centrally bored there through. Said central bore may be divided into main portion 12, as well as communicating enlarged counter-bored portions 12a, 12b, and 12c. Generalized actuator fluid source 40 communicates with bore 12 through inlet port 13. Such bore may be in fluid communication with actuator 50 through exit port 14. Bore 12 may also communicate with atmosphere through exhaust port 15, while bore section 12b may so communicate via bleed port 16. Finally, enlarged bore portion 12c may be in fluid communication with a remote indicator 60, by way of fluid passageway 17, through plug 18, as well as with pilot 70 through axial bore 19 of plug 18. Threadedly engaged with housing 11, at one end thereof, is said plug 18.

Slidable within bore portions 12–12c is a valve member generally indicated at 20. The valve member generally comprises elongated stem 21 with piston members 22 and 23 affixed thereto. A nipple 24 depends from piston 23, and may slidably enter plug bore 19, within O-ring seal 25. Piston 23 further carries peripheral seal 26. Spring 27 circumscribes stem 21 within cavity 28, formed within enlarged counterbore 12b, and bears against piston 23, urging it to the closed position illustrated by the FIGURE.

Fluid passageway 29 extends upwardly substantially through stem 21, and communicates at its lower end with counterbore 12c through orifice 30. Above cavity 28, piston 22 laterally depends from stem 21, and carries peripheral seal 31. It may be noted that upward movement of piston 22 is limited by shoulder 32 connecting bore 12 and counterbore 12a.

Continuing upwardly, stem 21 carries a pair of peripheral annular seals 33. The other side of annular stem cutaway 34 from seals 33, stem 21 carries additional annular seal 35. Further up, annular stem cutaway 36 communicates with stem passageway 29 by bore 37. In this general area, housing 11, at its upper end carries annular seal 38, and is laterally tapped at 39, said tap having female threads. Within such tap, fitting 80 is threaded. Fitting 80 has bore 82 and communicating counterbore 81 extending therethrough, with seal 83 extending around bore portion 82. Slidably extending through fitting bores 81, 82 is a detent. Said detent includes handle 84, shank 85, shoulder 86, and pin 87. Pin 87 extends through slot 88, which slot extends through the wall of housing 11.

The upper end of valve 20 includes male threads 89. A combination grasping and indicating member is generally indicated at 90. This member includes cylinder 91 having handle portion 92. The cylinder is interiorly threaded at 93, to mate with the exterior threads 94 of indicator cylinder 95. Said cylinder carries, interiorly threaded, depending lug 96 which receives threads 89 of valve 20.

The structure of the indicator will only be generally described, since it is presently marketed by Norgren, under the mark WINKIE LIGHT. Interior of cylinder 95, lateral diaphragm 97 is carried by pin 98. At the top of cylinder 95, a rotatable indicator cap 99 is fixed. Internally, a mechanism is provided whereby on sufficient upwardly pressure being exerted against diaphragm 97, cap 99 will be caused to change color, as by rotating the cap or a colored screen element.

Consider not the operation of the control. In the valve position of the FIGURE, actuator fluid is barred by seals 33 from passing to actuator 50. Any fluid present in the actuator or its conduit system may pass through port 14, cutout 34, through exhaust 15. On a return of pilot pressure through bore 19, such pressure acting against nipple 24 would be insufficient to shift valve 20 to upward position. Any pilot fluid slipping by seal 25 would pass through the opening between seal 26 and the interior wall of counterbore 12c, to exhaust through bleed 16, thus, the internal lock-out.

In order to permit actuator fluid to course from source 40 to actuator 50, an upward force would be exerted against handles 92, as by a manual pull. This would upwardly shift valve 20, until piston 22 abuts shoulder 32, placing seals 33 in a blocking position between ports 14, 15, and permitting actuator fluid to follow the path from fluid source 40, port 13, around stem 21, port 14 to actuator 50. At such upper position, slot 88 would be aligned with cutaway 36, to permit detent handle 84 to be manually depressed causing pin 87 to enter such cutaway 36, temporarily locking valve 20 in its up or open position. On the return of pilot pressure from pilot 70, usually on the order of 80 P.S.I., such pressure, acting against the under surface of piston 23, would tend to retain valve 20 in its open position. Seal 26 would bar bleeding through bleed port 16. Such pilot pressure would pass through orifice 30, into passageway 29, and upwardly therein. This pressure acting against the end of pin 88 would force it outwardly of cutaway 36, and would impinge against diaphragm 97, causing the indicator to give its signal indicating fluid provision to the actuator. Also, such pilot pressure, on passing through plug passageway 17 to remote indicator 60, similar to members 97-99, would provide remote indication. On pilot pressure failure, spring 27 and/or fluid pressure from source 40 acting on piston 22, would return valve 20 to its closed position again. Thus it may be noted that this control performs a number of functions. It controls the supply of actuator fluid. It indicates its own condition both in place and remotely. It possesses an automatic lockout. It contains a manual bypass.

Although only a single embodiment has been depicted, it should be obvious that numerous modifications would be possible by one skilled in the art without departing from the spirit of the invention, the scope of which is intended to be limited only by the following claims.

I claim:

1. In a valve control device having:
   (a) a cylindrical housing which housing includes an axial bore therethrough, a first fluid entry port, a second fluid entry port, a first fluid exit port, an exhaust port, all such ports being in communication with said axial bore;
   (b) a slide valve member extending substantially through said axial bore and movable between a first position permitting fluid communication between said first fluid entry port and said first fluid exit port to a second position blocking fluid communication between said first fluid entry port and said first fluid exit port;
   (c) means preventing fluid pressure entering said second fluid entry port from moving said slide valve member from said second position to said first position; and
   (d) manually operable means for moving said slide valve member from said second position to said first position, the improvement comprising:
   (a) an axial fluid passageway extending substantially through the length of said slide valve member;
   b. combination upper lateral fluid passageway and detent pin receiving means through said slide valve member communicating between said axial bore and the exterior of said slide valve member;
   c. detent housing laterally extending from said housing;
   d. detent member laterally movable within said detent housing, said detent member having a pin portion depending therefrom;
   e. detent pin passageway laterally extending through a wall of said cylindrical housing in communication with said combination passageway and receiving means only when said slide valve member is in said first position, whereby on said slide valve member being manually moved from said second to said first position, and said detent pin being caused to extend within said combination passageway and receiving means, fluid pressure from said second fluid entry port may cause extraction of said detent pin from said combination passageway and receiving means.

2. The device of claim 1 wherein said manually operable means includes slide valve position signalling means.

* * * * *